United States Patent
Wentzloff et al.

(10) Patent No.: US 10,732,293 B2
(45) Date of Patent: Aug. 4, 2020

(54) QUADRATURE FULLY-INTEGRATED TRI-BAND GPS RECEIVER

(71) Applicant: THE REGENTS OF THE UNIVERSITY OF MICHIGAN, Ann Arbor, MI (US)

(72) Inventors: David D. Wentzloff, Ann Arbor, MI (US); Hyeongseok Kim, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 372 days.

(21) Appl. No.: 15/840,197

(22) Filed: Dec. 13, 2017

(65) Prior Publication Data
US 2019/0179032 A1 Jun. 13, 2019

(51) Int. Cl.
*G01S 19/32* (2010.01)
*G01S 19/37* (2010.01)
*G01S 19/34* (2010.01)

(52) U.S. Cl.
CPC .............. *G01S 19/32* (2013.01); *G01S 19/34* (2013.01); *G01S 19/37* (2013.01)

(58) Field of Classification Search
CPC .......... G01S 19/09; G01S 19/32; G01S 19/34; G01S 19/37
See application file for complete search history.

(56) References Cited

U.S. PATENT DOCUMENTS

| 5,280,636 A * | 1/1994 | Kelley | H04B 1/005 375/240 |
| 6,574,459 B1 * | 6/2003 | Kaminski | H04B 7/084 455/272 |
| 2010/0130156 A1 * | 5/2010 | Jin | H04B 1/30 455/296 |
| 2013/0094610 A1 * | 4/2013 | Ghannouchi | H03F 1/3247 375/296 |
| 2019/0007255 A1 * | 1/2019 | Limberg | H04B 7/0885 |

* cited by examiner

*Primary Examiner* — Dao L Phan
(74) *Attorney, Agent, or Firm* — Harness, Dickey & Pierce, P.L.C.

(57) ABSTRACT

A quadrature fully integrated tri-band GPS receiver implemented in 65 nm CMOS. The analog front-end (AFE) is specifically designed for a miniaturized low-power GPS logger that leverages heavy duty-cycling. The main contribution of the RF front-end is comprised of two main signal paths which support the single-band only mode and the tri-band mode (L1, L2, L5). In the tri-band mode, the AFE is able to fold three GPS signals into a single low intermediate frequency channel in part due to the orthogonality of the pseudo-ransom codes. In active mode, the radio draws 12.1 mW in the single-band (L1) mode with a LNA and an active mixer, and 8.2 mW in the tri-band mode with a passive front-end, from a 1.2 V supply, and with a startup time of 20 us.

16 Claims, 10 Drawing Sheets

QUADRATURE FULLY-INTEGRATED TRI-BAND GPS RECEIVER

FIELD

The present disclosure relates to an analog front-end for an RF receiver which can sample three bands onto a single IF channel simultaneously.

BACKGROUND

There is a growing demand for GPS tracking systems with low-power consumption, millimeter scale form factor and high performance. Interest in these systems is being driven by a desire for a smaller form factor and increased energy efficiency for the applications, such as smart watches, wearable devices, asset trackers, and drones. Despite the interest in GPS tracking systems, one of their main limitations is power consumption. Most GPS tracking systems run continuously, leading to relatively high power consumption. This comes at a cost of limited life time of GPS tracking systems, particularly, those with a Li-ion battery and small form factors. A number of solutions to prolong the lifetime have been offered, including the use of GPS loggers which designed to log the position over time at regular interval in its internal memory. The GPS logger can reduce the average power significantly through heavy duty-cycling. When duty-cycling is used, the stream of data is collected in a SRAM and transferred to a flash during the reception time. In this process, the correlation of the data is processed at the base station after the data is retrieved.

Figure 1A:
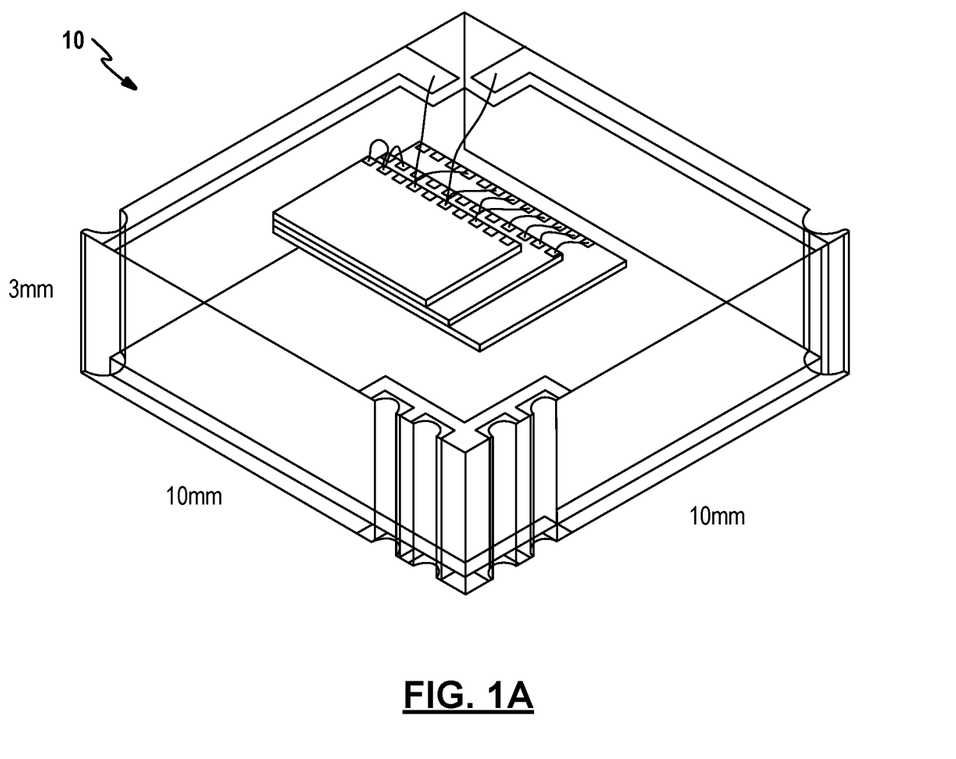
FIG. 1A is a perspective view of an example GPS logger.
Figure 1B:
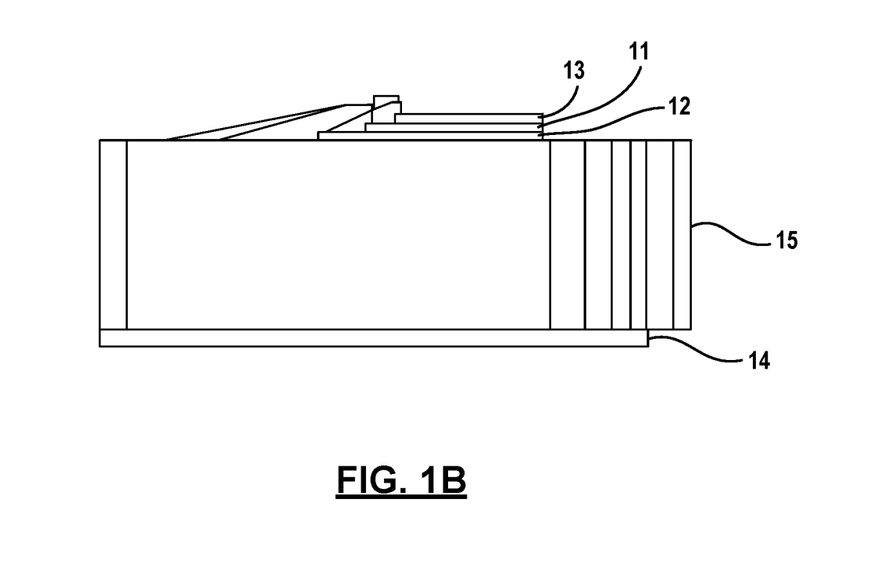
FIG. 1B is a side view of the example GPS logger.

FIG. 1 depicts an example of a GPS logger 10. The analog front-end (AFE) is specifically designed for the application of a fully integrated, miniaturized GPS logger. As shown in FIG. 1B, the system includes an analog front-end 11, correlator 12, flash memory 13, battery 14 and antenna 15 with a volume of a 10×10×3 mm$^3$ volume. The AFE uses sparse duty cycling that turns on for 100 ms every hour. The AFE boots up and shuts down in 20 us, minimizing the energy overhead from startup. After the GPS AFE is shut down, an off-chip correlator calculates the updated time and position and passes the result to the rest of the mm-scale system. Since highly accurate time is kept, the AFE can also turn on precisely when new satellite ephermerides are broadcast; and sleep during the rest of the transmission.

This disclosure introduces a fully integrated energy efficient GPS AFE designed for heavy duty cycling to reduce average power.

This section provides background information related to the present disclosure which is not necessarily prior art.

SUMMARY

This section provides a general summary of the disclosure, and is not a comprehensive disclosure of its full scope or all of its features.

A method is presented for processing incoming RF signals from multiple bands by an analog front-end of an RF receiver. The method includes receiving N RF signals in analog form concurrently, where N is an integer greater than two and each RF signal is in a different band of an RF spectrum; folding N−1 signals of the N RF signals onto a remaining RF signal from the N signals to form a single combined signal, where the combined signal has a frequency less than each of the N RF signals; bandpass filtering the combined signal; and converting the filtered combined signal to a digital form.

Each of the N RF signals is preferably spread within a particular bandwidth using a particular pseudo-random code and pseudo-random codes are unique amongst the N RF signals. The method may further include correlating the filtered combined signal in digital domain to recover a pseudo-random code from each of the N RF signals.

An analog front-end is also presented for an RF receiver. The analog front-end includes a first mixing stage, a second mixing stage, a filter stage and an ADC stage. The first mixing stage is configured to receive an oscillating signal and at least three RF signals concurrently in analog form, such that each of the at least three RF signals is in a different band of RF spectrum. The first mixing stage down converts the oscillating signal to achieve a first mixing signal and mixes the at least three signals with the first mixing signal to yield a first set of mixed signals, such that the first mixing signal has a frequency halfway between frequencies of a given pair of RF signals from the at least three RF signals and thereby folds the given pair of RF signals onto each other to form a folded pair of RF signals.

The second mixing stage is configured to receive the first set of mixed signals from the first mixing stage and the first mixing signal. The second mixing stage down converts the first mixing signal to achieve a second pair of mixing signal and mixes the first set of mixed signals with the second pair of mixing signals to yield two pair of mixed signals, such that the second pair of mixing signals has a frequency halfway between frequency of the folded pair of RF signals and a down-converted frequency of a third RF signal from the at least three RF signals.

The filter stage is configured to receive the two pair of mixed signals from the second mixing stage and operates to bandpass filter signals in the two pair of mixed signals; whereas, the ADC stage is configured to receive the two pair of mixed signals from the filter stage and operates to convert signals in the two pair of mixed signals to a digital form.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 2:
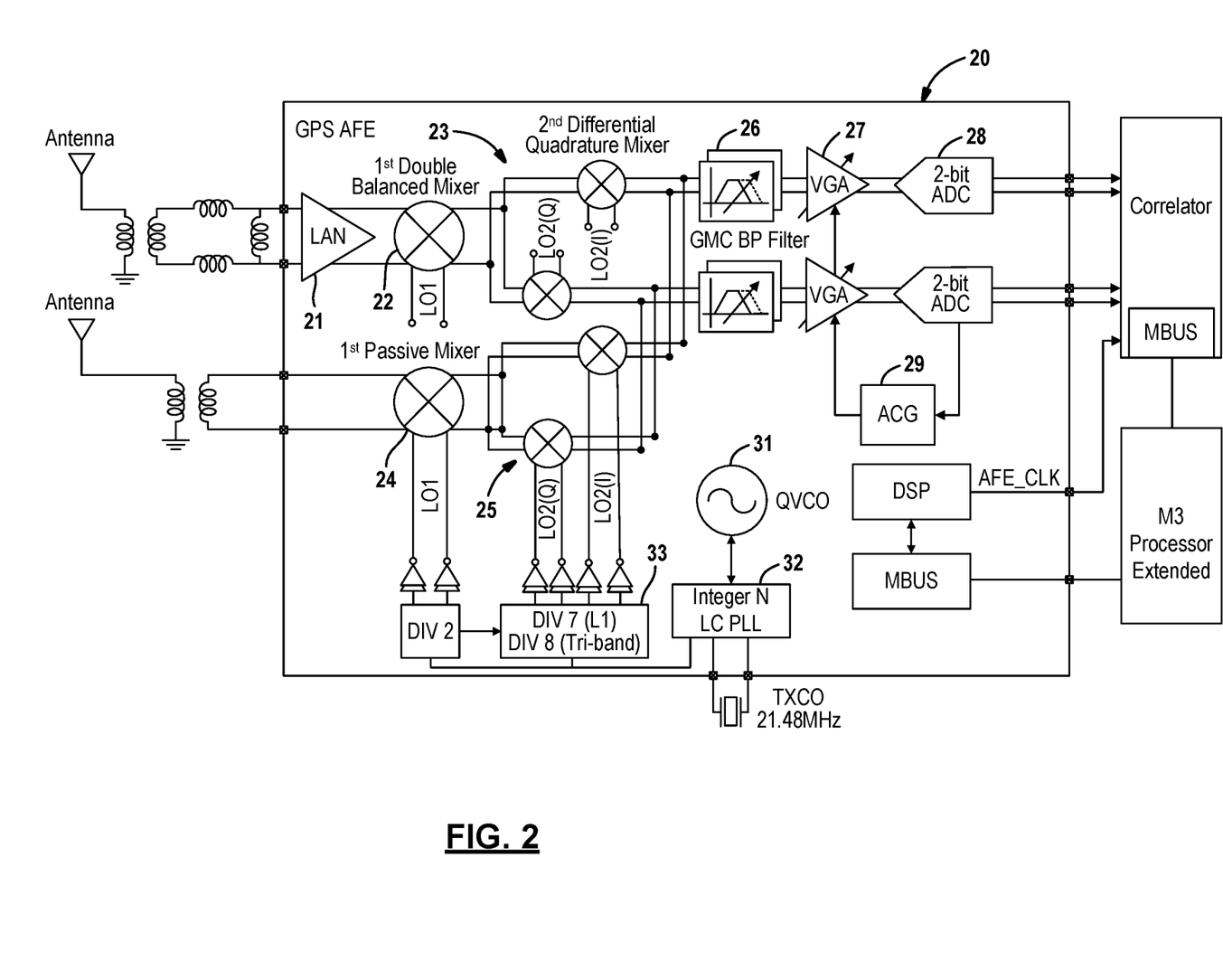
FIG. 2 is a block diagram of an analog front-end which may be used in an RF receiver.

FIG. 2 depicts an analog front-end 20 which may be used in an RF receiver. The entire receiver employs fully differential quadrature signals. The RF front-end is comprised of two main signal paths which support a single-band only mode, and a tri-band mode. In both paths, the analog front-end adopts a dual down-conversion architecture. Each signal path is further described below.

During operation, the analog front-end 20 operates in either single-band mode or tri-band mode (e.g., 1.57542 GHz L1, 1.2276 GHz L2 and 1.17645 GHz L5). In the single-band mode, the signal passes through the internal low noise amplifier (LNA) and the active double balanced mixer to provide better selectivity, conversion gain, and noise figure in any band. In the tri-band mode, a two-step down-conversion process with a passive front-end is used to fold the three GPS bands onto a single low-IF so that they can be sampled simultaneously by a single baseband path. This has a minimal impact on the sensitivity and increases the possibility of reception because the signals in different GPS bands are already below the thermal noise floor, and each transmission across the bands uses a unique pseudo-random (PRN) code. The PRN codes are highly orthogonal to one another, and therefore can be recovered in the digital domain after being folded on top of each other. Once one mode is selected, then the other path is disabled to reduce the leakage and minimize the loading impact.

For the single-band path, the signal path includes an internal LNA 21, a gilbert type double balanced mixer 22 at the $1^{st}$ down-conversion and a IQ passive mixer 23 at the $2^{nd}$ down-conversion. The output of the LNA 21 is ac-coupled to a gilbert type double-balanced quadrature mixer 22 which realizes $1^{st}$ down-conversion to IF1. An I/Q passive mixer, driven by a differential quadrature local oscillator (LO), performs the $2^{nd}$ down-conversion to IF2. The voltage-driven passive mixer is implemented to save the power of the transimpedance amplifier (TIA). This mode is designed for providing better conversion gain, noise figure and selectivity.

Figure 3:
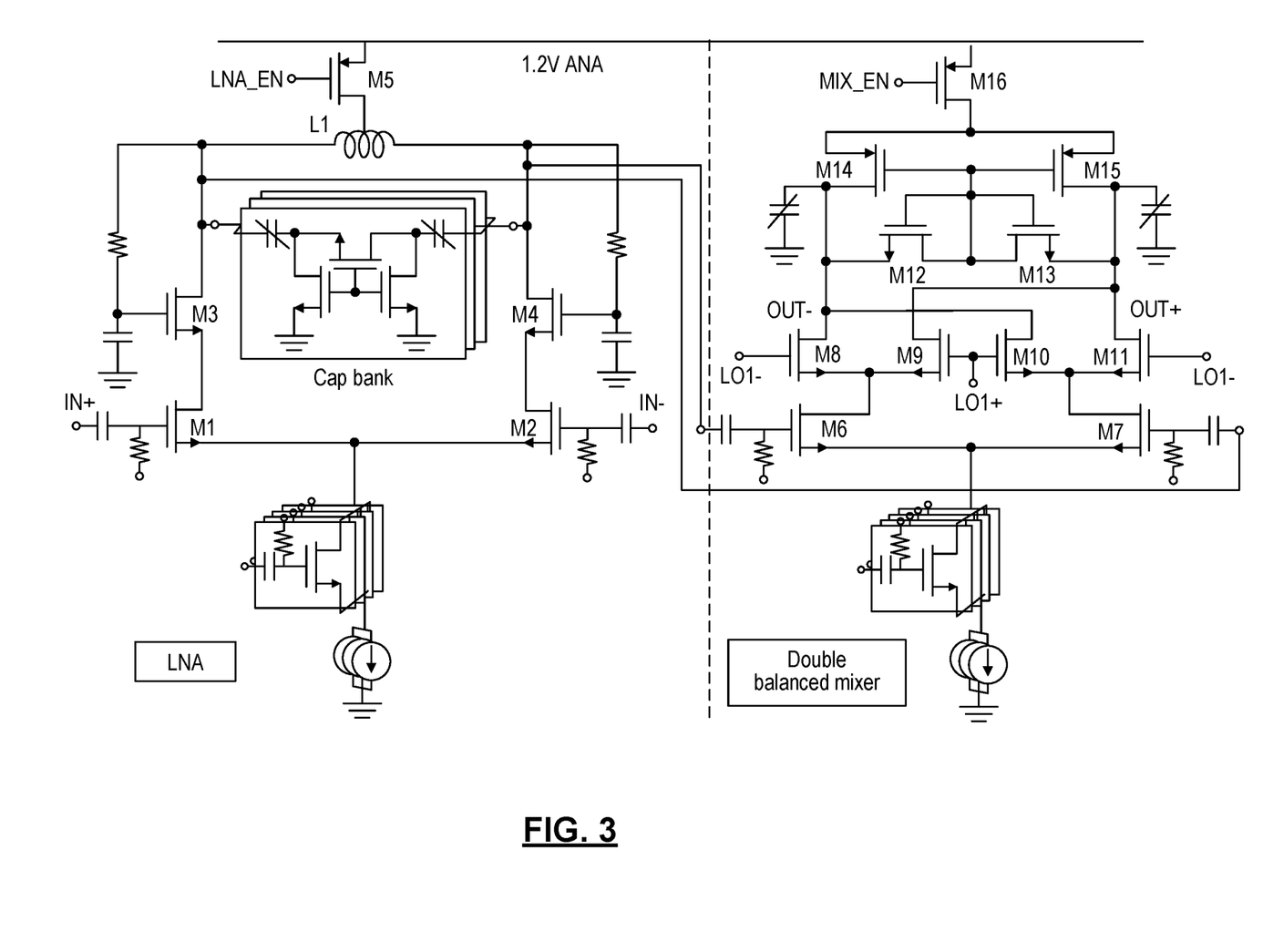
FIG. 3 is a schematic depicting an example embodiment of a low noise amplifier and an active mixer which may be used in the analog front-end.

FIG. 3 depicts an example implementation for the LNA 21 and the active mixer 22. More specifically, the schematic depicts a differential cascode CS LNA with a tunable LC load. The LC load is reconfigurable to account for PVT variation and filter out out-of-band interferers. The 6-bits cap bank at the LC load also supports covering a range from 1.1 GHz to 1.6 GHz. The input impedance of the LNA is co-designed with a custom, 1×1 cm, differential antenna to conjugate match its impedance. For test purposes, external matching components, a balun and inductors, are used instead. Other arrangements for the single-band path are contemplated by this disclosure.

For the tri-band mode, two consecutive I/Q passive mixers 24, 25 are used because of the wide RF bandwidth needed to capture all three bands. A tunable RC bank can be used to filter out the interferers after the $1^{st}$ down-conversion. Likewise, different arrangements are envisioned for the tri-band path.

In the tri-band mode, the RF signals from the different bands of the RF spectrum are folded onto each other so they can be processed in a single baseband path. This folding processing as implemented by the analog front-end 20 is further described in relation to FIGS. 4 and 5.

Figure 4:
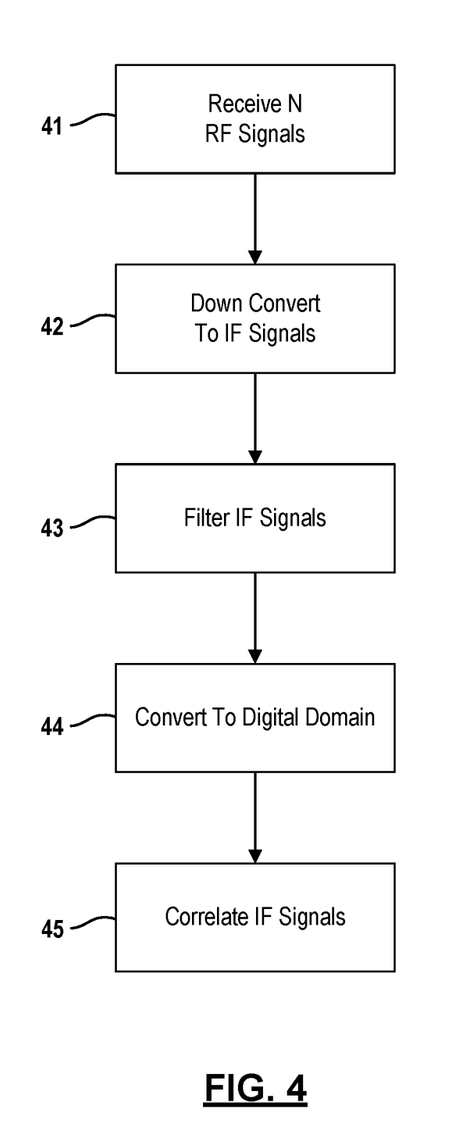
FIG. 4 is a diagram illustrating the processing of the incoming RF signals from multiple bands.

With reference to FIG. 4, the RF signals from the different bands are received at 41 concurrently in analog form by the analog front-end. In the example, the RF signals are from the L1, L2, and L5 bands of the RF spectrum. It is readily understood that the RF signals can come from other bands of the RF spectrum. It is also envisioned that the folding method extends to more or less than three bands. In this regard, the folding method is described in terms of N RF signals, where N is an integer greater than one.

For N RF signals, N−1 RF signals are folded onto the remaining signal in the N RF signals to form a lower intermediate frequency signal. The N−1 RF signals are folded at 42 using N−1 mixing stages. Each mixing stage includes one or more multiplicative mixers and each mixer is configured to receive a local oscillating signal, such that the frequencies of the local oscillating signals differ amongst the N−1 mixing stages. The RF signals are preferably folded such that the given signal onto which the other signals are folded has a spread in a given bandwidth that is wider than bandwidth associated with the other signals.

The intermediate frequency signal is filtered at 43, for example using a bandpass filter, and then converted at 44 to digital domain by an analog-to-digital converter. Lastly, the converted digital signal is correlated to recover the pseudo-random codes for each of the N RF signals. It is to be understood that only the relevant steps of the methodology are discussed in relation to FIG. 4, but that other signal processing steps may be needed to properly condition the signals.

Figure 5:
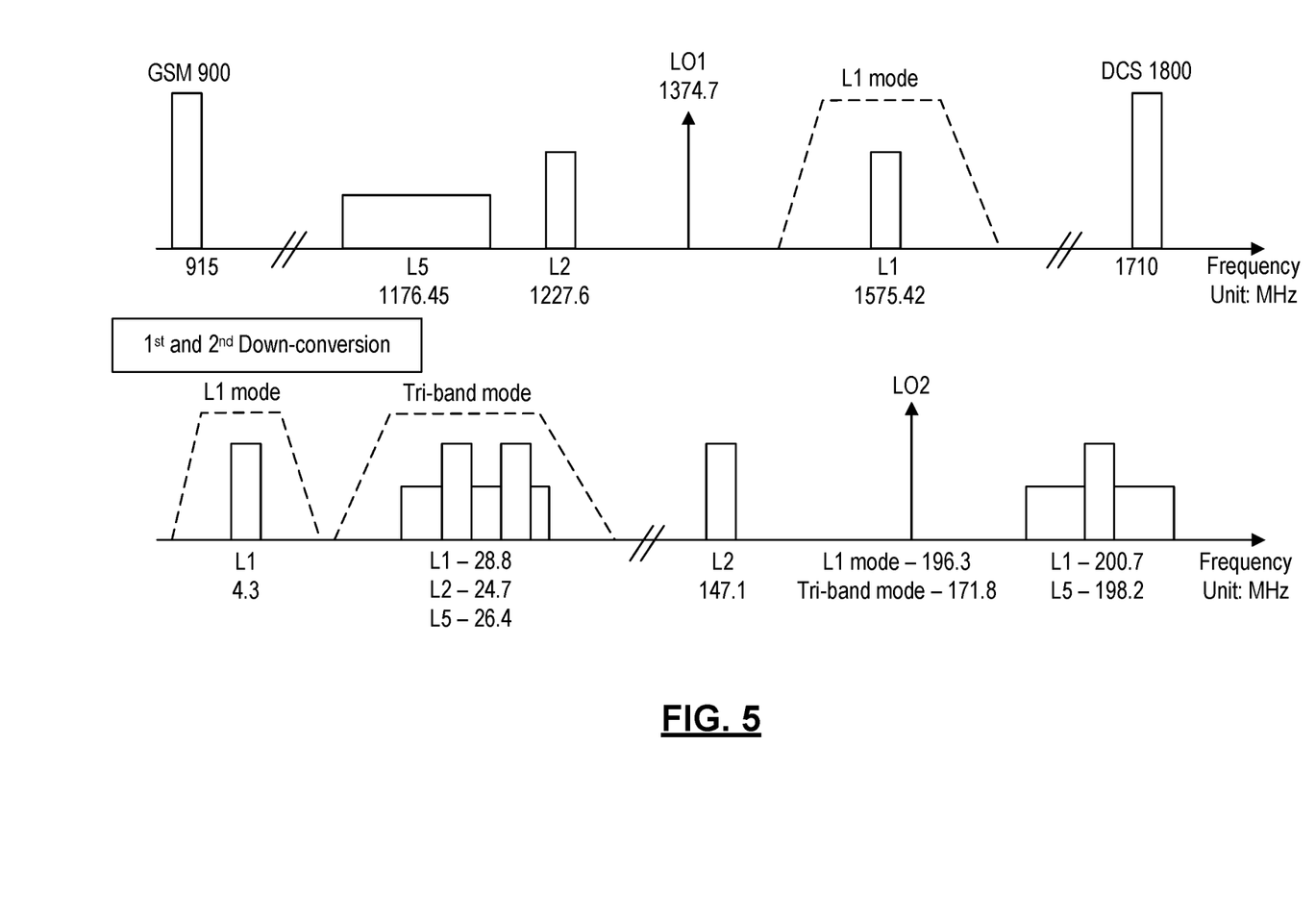
FIG. 5 is a diagram showing an example spectrum allocation for the L1 and tri-band modes of the RF receiver.

Selection the frequencies for the local oscillating signals depends on the frequencies of the incoming N RF signals. FIG. 5 illustrates the frequency selection for the dual down-conversion receiver in the single band mode and the tri-band mode, where the incoming signals are in the L1, L2, and L5 bands. In the tri-band mode, the three RF signals are first mixed with a first mixing signal LO1 to yield a first set of mixed signals. The first mixing signal LO1 is selected to have a frequency halfway between two of the three RF signals. In this example, the first mixing signal LO1 is set at 1374.7 MHz which is halfway between L1 and L5 as seen in the upper portion of FIG. 5. As a result, the RF signal in the L1 band is folded onto the RF signal in the L5 band as seen in lower right portion of FIG. 5.

The first set of mixed signals is mixed again with a second mixing signal LO2 to yield a second set of mixed signals. The second mixing signal LO2 is selected to have a frequency halfway between the frequency of the pair of folded signals and the frequency of the other downconverted signal (i.e., L2-LO1). In this example, the second mixing signal LO2 is set at 171.8 MHz which is halfway between the L1/L5 folded pair (e.g., 198.2 MHz) and downconverted L2 (e.g., 147.1 MHz) as seen in the lower right portion of FIG. 5. As a result, the downconverted L2 signal is folded on the folded pair to form a combined signal as seen in the lower left portion of FIG. 5.

To achieve this result, the VCO 31 oscillates at 2749.4 MHz and the LO1 is at 1374.7 MHz. The dividing ratio from LO1 of 7/8 is selected based on the mode for the appropriate LO2. In the single band mode, LO2 is 196.3 MHz, while in triband mode, LO2 is 171.8 MHz. This results in IF frequencies of 4.3 MHz in the L1 mode, and 28.8 MHz, 24.7 MHz and 26.4 MHz for L1, L2 and L5 bands, respectively, in the tri-band mode. Note that in tri-band mode, L1 and L2 both fold onto the wider L5 band, however because of the orthogonal PRN codes this has a minimal impact on the receiver sensitivity.

With continued reference to FIG. 2, each of the two signal paths merge into an intermediate path. The intermediate path performs filtering and amplification of signals at lower intermediate frequencies. In the example embodiment, the intermediate path is comprised of a band pass filter 26, a variable gain amplifier 27 (VGA) and a 2 bit analog-to-digital converter 28 (ADC). An automatic gain control (AGC) loop 29 controls the amplification of VGA, for example based on the histogram of the ADC codes to keep the signal strength at the ADC input. The ADC quantizes in 2 bits outputs of I/Q. The sampling rate at the single-band mode and the tri-band mode is 10.74 MHz and 55.7 MHz, respectively. The I/Q differential LO signals are generated by a frequency synthesizer with the integer-N PLL.

Figure 6:
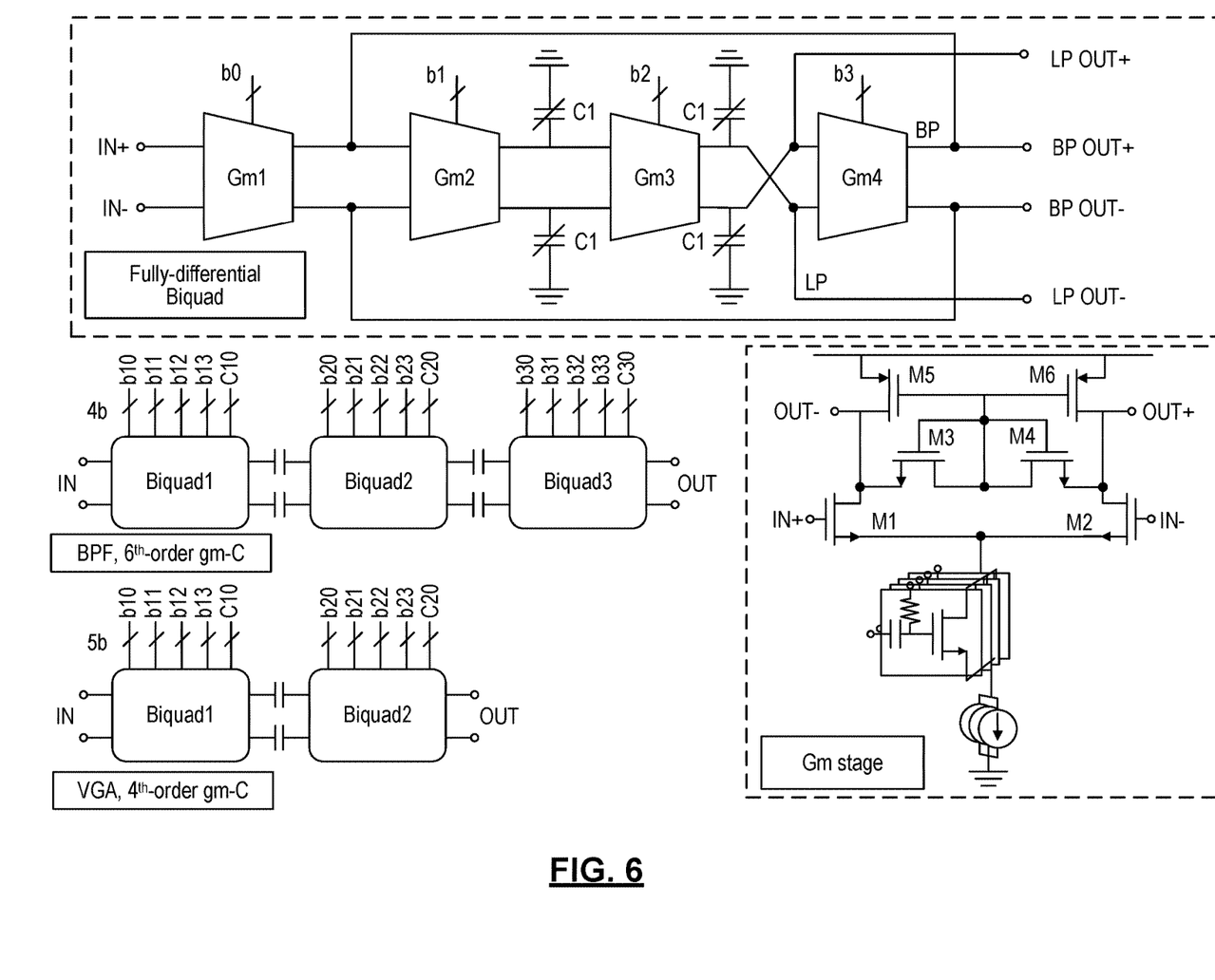
FIG. 6 is a schematic illustrating the IF path through the RF receiver.

An example embodiment of the low-IF path is shown in FIG. 6. In this example, the low-IF path is comprised of an IF filter and VGA with an AGC loop. The IF filter consists of 3 stages of fully-differential biquads and its output could be selected between the band-pass or low-pass outputs. The long channel NFETs, M3 and M4, provide common-mode feedback. At each gm stage, there are 4-bits for gm tuning. The cut-off frequency and Q of the filter are determined by C1 and Gm4. The VGA has $4^{th}$-order gm-C stages and the gain is tuned by Gm1. The AGC loop is implemented in the controller, and regulates the 5-bits VGA control code of Gm1 based on a target sigma value of the histogram of ADC codes. Other arrangements for the low IF path are contemplated by this disclosure.

The analog front-end 20 also includes a frequency synthesizer 30. The frequency synthesizer is designed to generate local oscillating signals for the different mixing stages in the two signal paths. In an example embodiment, an integrated integer-N PLL 32 is used to provide differential and quadrature signals from a voltage controlled oscillator 31. The LO2 frequency is selected through a divider 33 to enable simultaneous reception in tri-band. The differential LC VCO 31 oscillates at 2.749 GHz, twice the LO1 frequency, for improved inductor Q and provided IQ differential LO signals. The LO signal get divided further to provide sampling clock at ADC and DSP. It has an external loop filter with 100 kHz bandwidth and a reference clock frequency of 21.48 MHz. It is envisioned that the MBUS processor and DSP blocks are always-on, while the rest of blocks are in stand-by mode until receiving an enable signal from the off-chip correlator.

Figure 7:
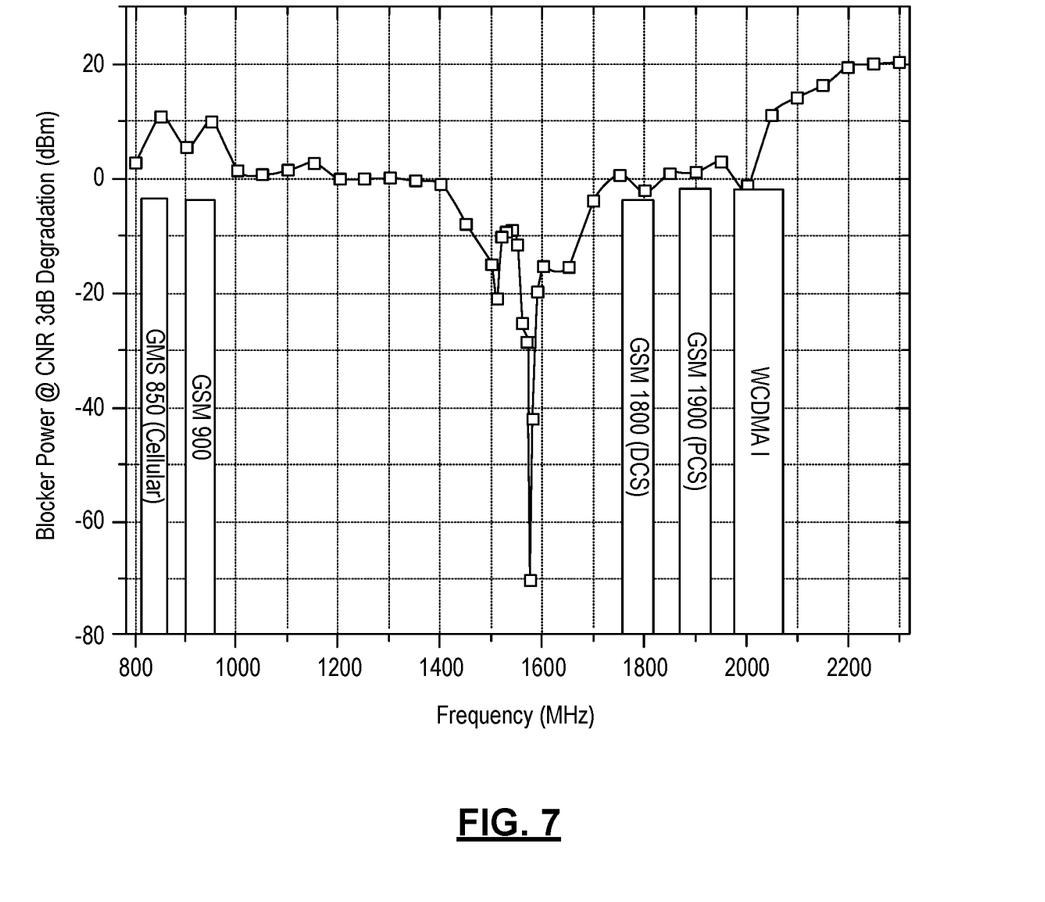
FIG. 7 is a graph showing measured out-of-band blocking performance (without SAW filter) for the RF receiver.

For proof of concept, a quadrature fully integrated tri-band GPS receiver is implemented in a 65 nm CMOS and packaged in a QFN 64 package. The AFE has two main RF signals paths for the single-band mode and the tri-band mode and one channel at an IF path. In the single-band mode, the measurement has performed optimizing the AFE in the L1 band only. The GPS receiver consumes 12.1 mW in L1 band mode from 1.2V. The input impedance of the LNA is co-designed with a custom miniaturized differential antenna to match the optimal impedance for a minimum noise figure. For the test purpose, external components, a balun and external inductors, are used instead and the impedance matched to 50Ω (S11<−10 dB). The AFE achieves a maximum conversion gain of 72 dB, a noise figures of 2.5 dB, P1 dB of 46 dB and IRR of 20 dB. The noise figure is measured after the $1^{st}$ down-conversion stage with the measured loss of the balun de-embedded. The blocker level that desensitizes the gain by 1 dB is −6.1 dB at 1710 MHz, one of the closed blockers near the GPS bands. The measured 3 dB CNR degradation level with the CW out-of-band blockers is shown in FIG. 7. The degradation level is measured without SAW filter. The front-end SAW filter or the High-Q GPS antenna will improve isolation to otherwise wireless radios.

Figure 8:
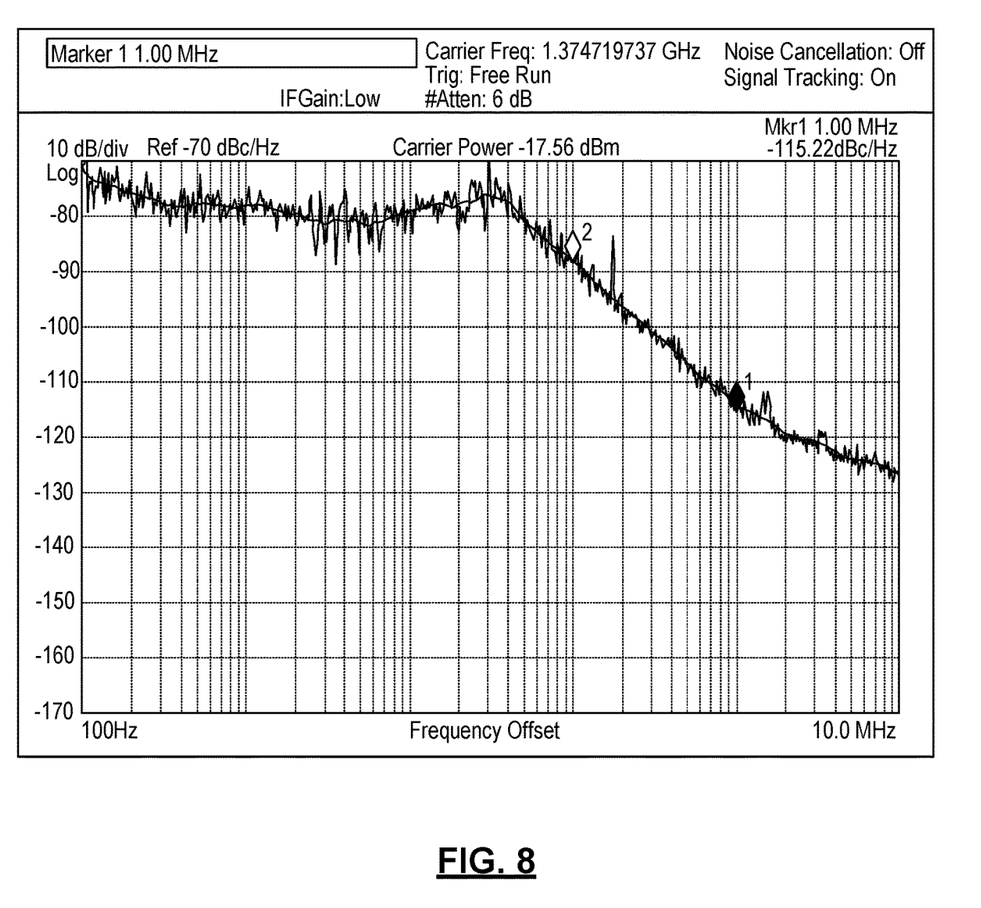
FIG. 8 is a graph showing the measured VCO phase noise for the RF receiver at 1374.7 MHz.

In tri-band mode, the receiver dissipates 8.2 mW with a passive front-end with a 1.2V supply. It exhibits a conversion gain of 35 dB and a noise figure of 23 dB. The measured phase noise of the VCO is plotted in FIG. 8 and achieves −87.8 dBc/Hz at 100 KHz and −115.2 dBc/Hz at 1 MHz offset frequency from the LO1 frequency at 1374.7 MHz.

Figure 9:
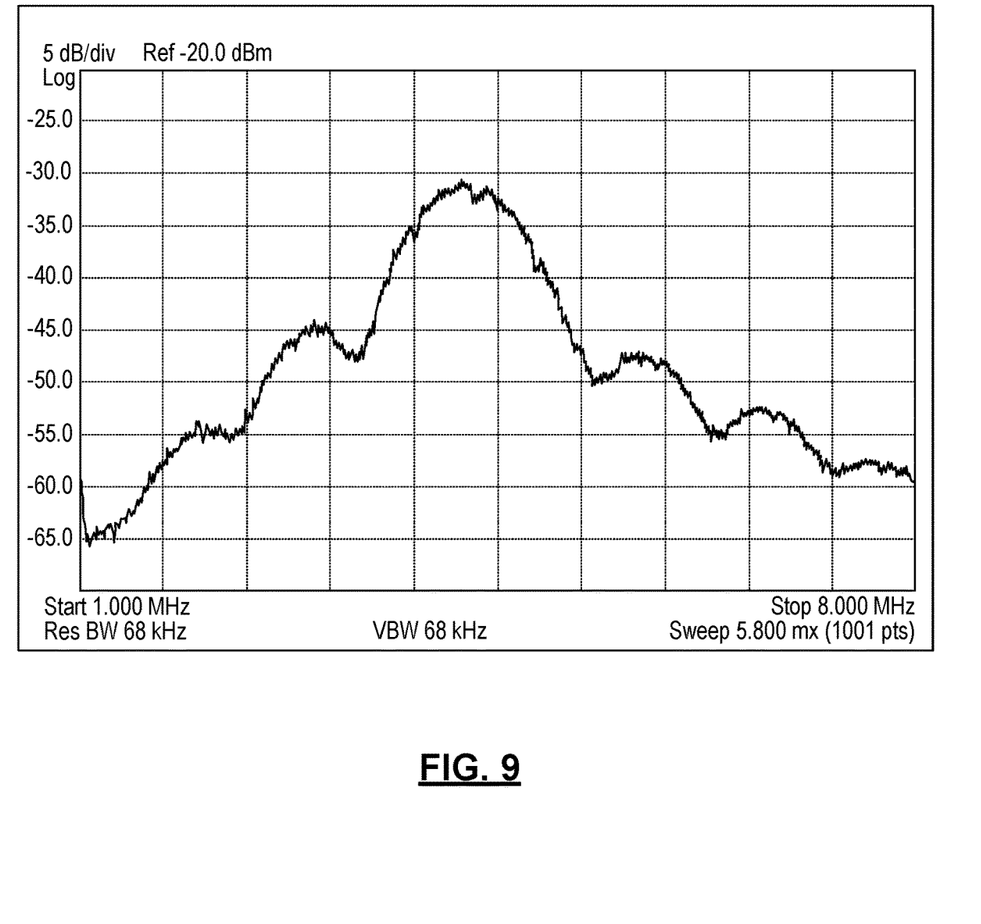
FIG. 9 is a graph showing the measured baseband spectrum for the RF receiver at the L1 mode.
Figure 10:
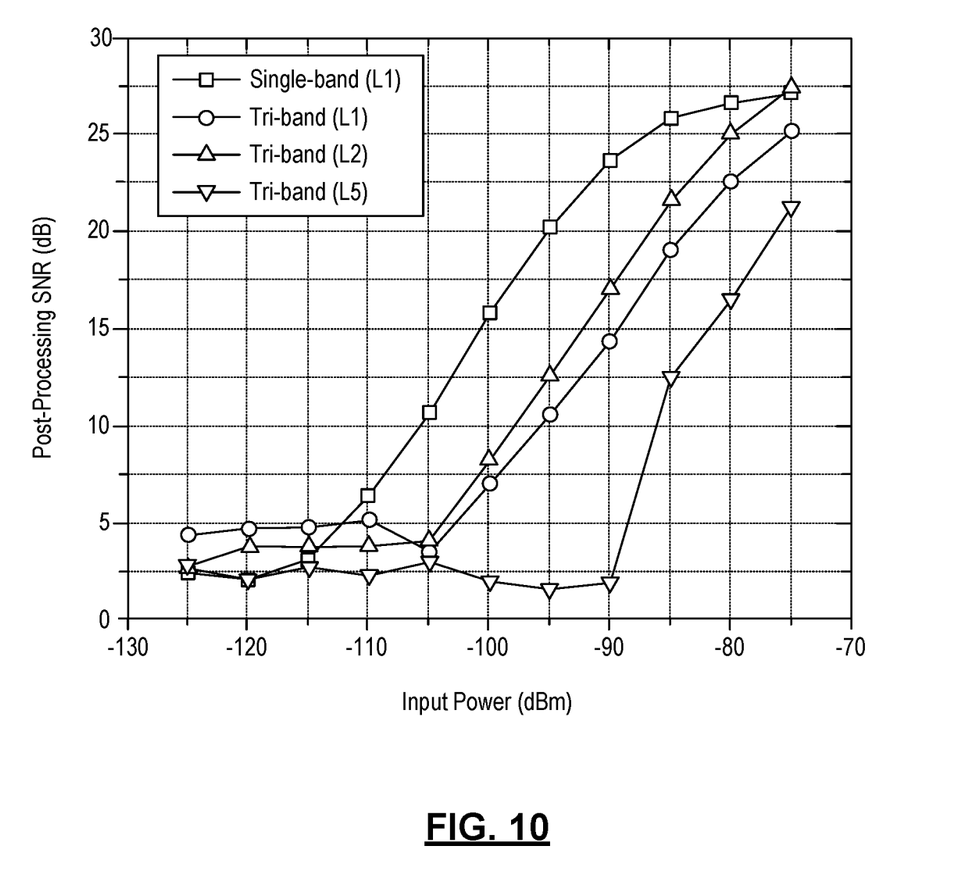
FIG. 10 is a graph showing the measured post-processing SNR in single-band and tri-band modes.

The custom GPS PRN sequence has implemented to measure the performance of the AFE with the correlation. The measured baseband spectrum of a test GPS L1 signal is shown in FIG. 9. The analog and digital output signals for both I and Q channels are captured for 1-100 ms. The digital down-conversion and the correlation has performed in Matlab. The results of the post-processing SNR after the correlation is shown in FIG. 10.

This disclosure describes a fully integrated tri-band GPS analog front-end receiver is fabricated in a 65 nm CMOS process. The energy efficient GPS AFE designed for extreme duty cycling to reduce average power. The AFE supports two modes: the single-band mode and the tri-band mode (1.57542 GHz L1, 1.2276 GHz L2 and 1.17645 GHz L5) operation simultaneously and both modes share one IF channel. In the L1 mode only, the AFE draws 12.1 mW from 1.2V and achieves a maximum conversion gain of 72 dB, a minimum noise figure of 2.5 dB, P1 dB of −46 dB, and IRR of 20 dB. In the tri-band mode, the receiver dissipates 8.2 mW with a passive front-end with a 1.2V supply. It exhibits a conversion gain of 35 dB and a noise figure of 23 dB.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for processing incoming RF signals from multiple bands by an analog front-end of an RF receiver, comprising:

receiving, by an analog front-end circuit, N RF signals in analog form concurrently, where N is an integer greater than two and each RF signal is in a different band of an RF spectrum;

folding, by the analog front-end circuit, N−1 signals of the N RF signals onto a remaining RF signal from the N signals to form a single combined signal, where the combined signal has a frequency less than each of the N RF signals;

bandpass filtering, by the analog front-end circuit, the combined signal; and converting, by the analog front-end circuit, the filtered combined signal to a digital form.

2. The method of claim 1 wherein each of the N RF signals is spread within a particular bandwidth using a particular pseudo-random code and pseudo-random codes are unique amongst the N RF signals.

3. The method of claim 1 further comprises correlating the filtered combined signal in digital domain to recover a pseudo-random code from each of the N RF signals.

4. The method of claim 1 further comprises folding N−1 signals such that the remaining RF signal is spread in a given bandwidth that is wider than bandwidth associated with each of the N−1 signals.

5. The method of claim 1 further comprises folding N−1 signals using N−1 mixing stages, where each mixing stage includes a multiplicative mixer and the multiplicative mixer is configured to receive a local oscillating signal, such that frequency of the local oscillating signal differs amongst the N−1 mixing stages.

6. The method of claim 5 further comprises generating a primary oscillating signal using a voltage controlled oscillator and deriving the local oscillating signals for each of the N−1 mixing stages from the primary oscillating signal.

7. The method of claim 6 wherein deriving the local oscillating signals further comprises dividing the primary oscillating signals using a divider circuit.

8. The method of claim 1 wherein N is three and each RF signal is from L band of the RF spectrum.

9. The method of claim 8 wherein folding N−1 signals further comprises mixing the three RF signals with a first mixing signal to yield a first set of mixed signals and subsequently mixing the first set of mixed signals with a second mixing signal to yield a second set of mixed signals, where the first mixed signal has a frequency halfway between frequency of two of the three RF signals, the first set of mixed signals includes a pair of signals folded onto each other, and the second mixed signal has a frequency halfway between frequency of the pair of folded signals and down-converted frequency of third of the three RF signals.

10. An analog front-end for an RF receiver, comprising:
a first mixing stage configured to receive an oscillating signal and at least three RF signals concurrently in analog form, such that each of the at least three RF signals is in a different band of RF spectrum, wherein the first mixing stage down converts the oscillating signal to achieve a first mixing signal and mixes the at least three signals with the first mixing signal to yield a first set of mixed signals, such that the first mixing signal has a frequency halfway between frequencies of a given pair of RF signals from the at least three RF signals and thereby folds the given pair of RF signals onto each other to form a folded pair of RF signals;
a second mixing stage configured to receive the first set of mixed signals from the first mixing stage and the first mixing signal, wherein the second mixing stage down converts the first mixing signal to achieve a second pair of mixing signal and mixes the first set of mixed signals with the second pair of mixing signals to yield two pair of mixed signals, such that the second pair of mixing signals has a frequency halfway between frequency of the folded pair of RF signals and down-converted frequency of a third RF signal from the at least three RF signals;
a filter stage configured to receive the two pair of mixed signals from the second mixing stage and bandpass filter signals in the two pair of mixed signals from the second mixing stage; and
a ADC stage configured to receive the two pair of mixed signals from the filter stage and convert signals in the two pair of mixed signals to a digital form.

11. The analog front-end of claim 10 wherein each of the N RF signals are spread within a particular bandwidth using a particular pseudo-random code and pseudo-random codes for the N RF signals are orthogonal to each other.

12. The analog front-end of claim 10 wherein each of the at least three RF signals is from L band of the RF spectrum.

13. The analog front-end of claim 10 wherein the first mixing stage includes a passive mixer and a first local oscillator, where the first local oscillator receives the oscillating signal from a voltage-controlled oscillator and divides the oscillating signal using a first divider circuit.

14. The analog front-end of claim 13 wherein the second mixing stage includes a pair of passive mixers and a second local oscillator, where the second local oscillator receives the oscillating signal from the voltage-controlled oscillator and divides the oscillating signal using a second divider circuit.

15. The analog front-end of claim 14 further comprises a correlator configured to receive output from the ADC stage and correlates the output in digital domain to recover a pseudo-random code from each of the N RF signals.

16. The analog front-end of claim 10 further comprises
a third mixing stage configured to receive another RF signal having a single mode and the oscillating signal, wherein the third mixing stage down converts the oscillating signal to achieve a third mixing signal and mixes the another RF signal with the third mixing signal to yield a third pair of mixed signals; and
a fourth mixing stage configured to receive the third pair of mixed signals from the third mixing stage and the third mixing signal, wherein the fourth mixing stage down converts the third mixing signal to achieve a fourth pair of mixing signals and mixes the third pair of mixed signals with the fourth pair of mixing signals, wherein the filter stage is configured to receive one of the two pair of mixed signal from the second mixing stage or the two pair of mixed signals from the fourth mixing stage.

* * * * *